US011402255B2

(12) United States Patent
Kawanishi

(10) Patent No.: US 11,402,255 B2
(45) Date of Patent: Aug. 2, 2022

(54) COMPACT WEIGHING APPARATUS INCLUDING ROUGH-CHARGE WEIGHER AND COMBINATION WEIGHER

(71) Applicant: Shozo Kawanishi, Nishinomiya (JP)

(72) Inventor: Shozo Kawanishi, Nishinomiya (JP)

( * ) Notice: Subject to any disclaimer, the term of this patent is extended or adjusted under 35 U.S.C. 154(b) by 441 days.

(21) Appl. No.: 16/608,747

(22) PCT Filed: Apr. 27, 2018

(86) PCT No.: PCT/JP2018/017294
§ 371 (c)(1),
(2) Date: Oct. 25, 2019

(87) PCT Pub. No.: WO2018/199321
PCT Pub. Date: Nov. 1, 2018

(65) Prior Publication Data
US 2021/0063230 A1    Mar. 4, 2021

(30) Foreign Application Priority Data
Apr. 28, 2017    (JP) .............................. JP2017-089866

(51) Int. Cl.
*G01G 19/393*    (2006.01)
*G01G 13/24*    (2006.01)

(52) U.S. Cl.
CPC ......... *G01G 13/241* (2013.01); *G01G 19/393* (2013.01)

(58) Field of Classification Search
CPC ..... G01G 13/24; G01G 13/241; G01G 19/393
See application file for complete search history.

(56) References Cited

U.S. PATENT DOCUMENTS

| 8,525,049 B2 * | 9/2013 | Kawanishi | ........... G01G 19/393 |
| | | | 177/25.18 |
| 11,137,280 B2 * | 10/2021 | Kawanishi | ............. G01G 13/24 |

FOREIGN PATENT DOCUMENTS

| EP | 0171295 A2 | 2/1986 |
| EP | 0171295 A3 | 10/1986 |
| EP | 0736754 A1 | 10/1996 |
| JP | 2003207384 A | 7/2003 |

* cited by examiner

*Primary Examiner* — Randy W Gibson
(74) *Attorney, Agent, or Firm* — Alleman Hall Creasman & Tuttle LLP

(57) ABSTRACT

A weighing apparatus includes a rough-charge weigher and a combination weigher. A plurality of weighing hoppers of the combination weigher are, when seen in a plan view, arranged in a manner to form a line that constitutes a part of a virtual circle. The plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper. The rough-charge weigher is, when seen from the one-end weighing hopper and the other-end weighing hopper, disposed at an opposite side to the middle weighing hoppers, and at least a part of the rough-charge weigher is disposed inside the virtual circle or on the virtual circle.

19 Claims, 8 Drawing Sheets

COMPACT WEIGHING APPARATUS INCLUDING ROUGH-CHARGE WEIGHER AND COMBINATION WEIGHER

TECHNICAL FIELD

The present invention relates to a weighing apparatus including a rough-charge weigher and a combination weigher.

BACKGROUND ART

Conventionally, there is a known weighing apparatus including a rough-charge weigher and a combination weigher. The rough-charge weigher weighs out objects to be weighed by a large-charge weighing hopper, such that the weighed objects have a weight less than a target weight by a predetermined weight, and discharges the weighed objects. The combination weigher weighs objects to be weighed by a plurality of small-charge weighing hoppers, performs combination calculation based on weights of the weighed objects that have been weighed by the plurality of small-charge weighing hoppers, thereby selecting the weighed objects in an optimal combination of small-charge weighing hoppers, and discharges the selected weighed objects (see Patent Literature 1, for example). According to this weighing apparatus, the difference between the target weight and the weight of the weighed objects that have been weighed out by the rough-charge weigher is used as a target combination weight. The combination weigher precisely weighs the objects to be weighed, and discharges the precisely weighed objects. In a collection chute, the weighed objects discharged from the combination weigher and the weighed objects discharged from the rough-charge weigher are gathered together. In this manner, favorable quantitative precision is achieved even if the target weight is great.

CITATION LIST

Patent Literature

PTL 1: Japanese Laid-Open Patent Application Publication No. 2003-207384

SUMMARY OF INVENTION

Technical Problem

However, in the configuration of Patent Literature 1, the rough-charge weigher is provided next to the combination weigher, and the combination weigher includes the weighing hoppers that are, when seen in a plan view, arranged side by side in a circular shape. The weighing apparatus having such a configuration is long in the direction in which the combination weigher and the rough-charge weigher are arranged side by side. As a result, the overall weighing apparatus, which is constituted by the rough-charge weigher and the combination weigher, occupies a large space.

In view of the above, an object of the present invention is to reduce the overall size of a heavy-weight weighing apparatus that includes a rough-charge weigher and a combination weigher.

Solution to Problem

A weighing apparatus according to one aspect of the present invention includes: a rough-charge weigher including at least one rough-charge hopper configured to be fed with objects to be weighed, the rough-charge weigher being configured to weigh out the fed objects to be weighed, such that the weighed objects have a predetermined rough-charge weight less than a target weight, and discharge the weighed objects; a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers; and a collecting chute configured to collect the weighed objects discharged from a discharge port of the rough-charge weigher and the weighed objects discharged from a discharge port of the combination weigher, and discharge the collected weighed objects. The plurality of weighing hoppers are, when seen in a plan view, arranged in a manner to form a line that constitutes a part of a virtual circle. The plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper. The rough-charge weigher is, when seen from the one-end weighing hopper and the other-end weighing hopper, disposed at an opposite side to the middle weighing hoppers, and at least a part of the rough-charge weigher is disposed inside the virtual circle or on the virtual circle.

According to the above configuration, the weighing hoppers of the combination weigher are arranged in a manner to form the line, which constitutes a part of the virtual circle. Accordingly, when seen from the one-end weighing hopper and the other-end weighing hopper, an empty space can be formed inside the virtual circle or on the virtual circle at the opposite side to the middle weighing hoppers, and the rough-charge weigher can be disposed in the empty space. As a result, the distance between the rough-charge weigher and the weighing hoppers positioned at the farther side as seen from the rough-charge weigher can be shortened, which makes it possible to reduce the size of the overall weighing apparatus.

The at least one rough-charge hopper may include a plurality of rough-charge hoppers. The plurality of rough-charge hoppers may be, when seen in a plan view, arranged side by side along a virtual straight line that passes through the one-end weighing hopper and the other-end weighing hopper.

According to the above configuration, even if the at least one rough-charge hopper includes a plurality of rough-charge hoppers, the weighing apparatus can be effectively reduced in size.

The rough-charge weigher may include a rough-charge actuator configured to perform a discharge operation of the rough-charge hopper. The rough-charge actuator may be, when seen in a plan view, disposed between the rough-charge hopper and the combination weigher.

The above configuration makes it possible to keep the weighing apparatus compact while allowing the rough-charge hopper to be readily visually recognized from the outside.

The weighing apparatus may further include a common bed configured to support the rough-charge weigher and the combination weigher. The common bed may include a center opening that is open in a vertical direction. The collecting chute may be inserted in the center opening.

The above configuration makes it possible to form the weighing apparatus as a compact unit.

An amount of the weighed objects discharged from the discharge port of the rough-charge weigher may be greater than an amount of the weighed objects discharged from the discharge port of the combination weigher. The collecting chute may include a discharge port that is closer to the rough-charge weigher than to the combination weigher.

According to the above configuration, even if a time required for discharging the weighed objects from the rough-charge weigher to the collecting chute is longer than a time required for discharging the weighed objects from the combination weigher to the collecting chute, a time from when the discharging from the rough-charge weigher starts until when the discharging from the collecting chute ends can be shortened. This makes it possible to increase the weighing speed of the overall weighing apparatus.

The line may be a semicircular line. The rough-charge weigher may be disposed inside the virtual circle, or may be disposed on the virtual circle such that a position of the rough-charge weigher is shifted relative to the virtual circle toward the inside of the virtual circle.

According to the above configuration, protrusion of the rough-charge weigher from the virtual circle can be reduced sufficiently, and thereby the weighing apparatus can be reduced in size effectively.

The line may be a C-shaped line, and the rough-charge weigher may be disposed on the virtual circle.

The above configuration makes it possible to reduce the size of the weighing apparatus while sufficiently obtaining the number and/or capacity of weighing hoppers of the combination weigher so as to achieve high precision in combination weighing.

Advantageous Effects of Invention

The present invention makes it possible to reduce the overall size of a heavy-weight weighing apparatus that includes a rough-charge weigher and a combination weigher.

DESCRIPTION OF EMBODIMENTS

Hereinafter, embodiments are described with reference to the drawings.

Embodiment 1

[Brief Description of Weighing Apparatus]

Figure 1:
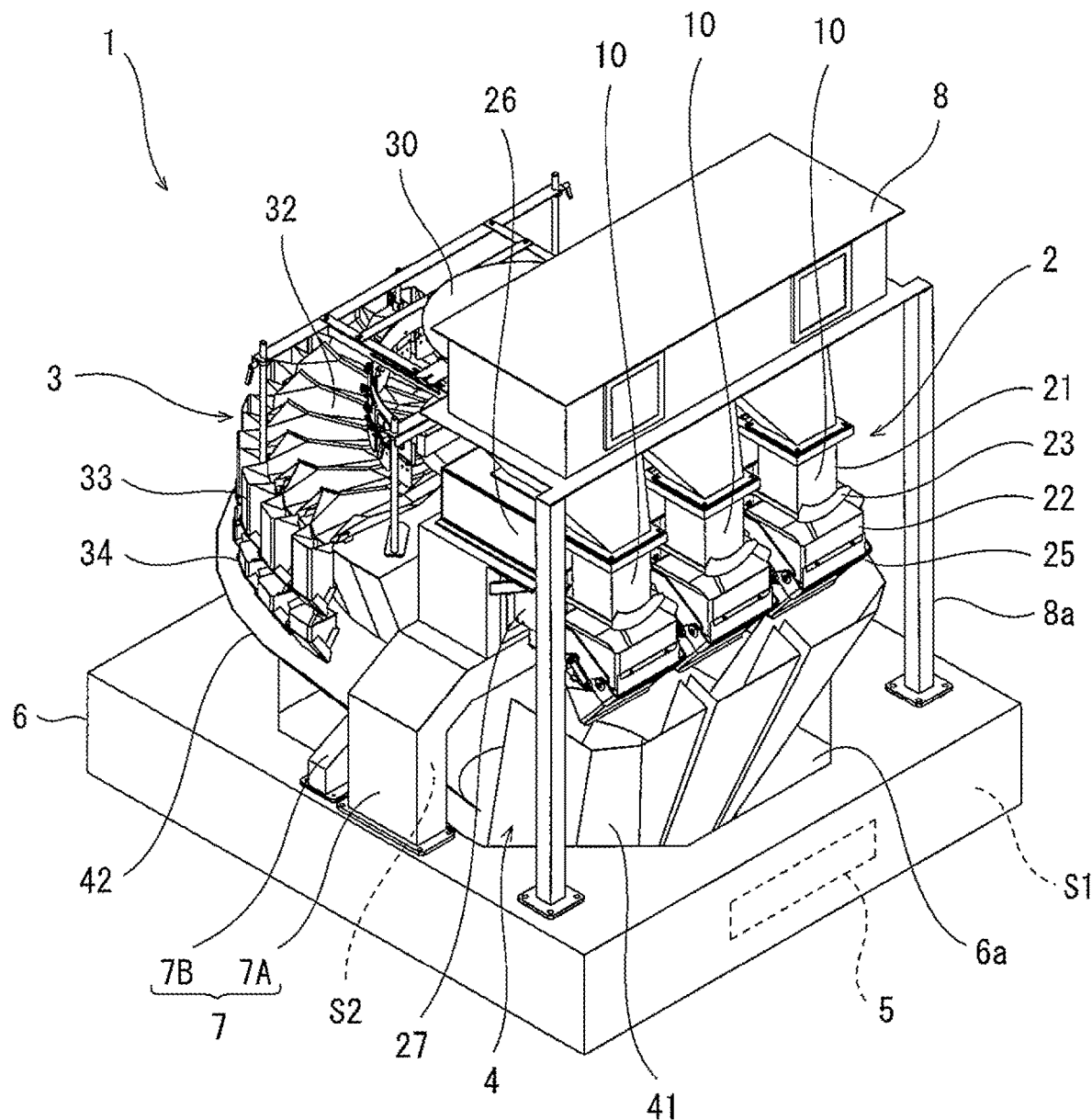
FIG. 1 is a top perspective view of a weighing apparatus according to Embodiment 1.
Figure 2:
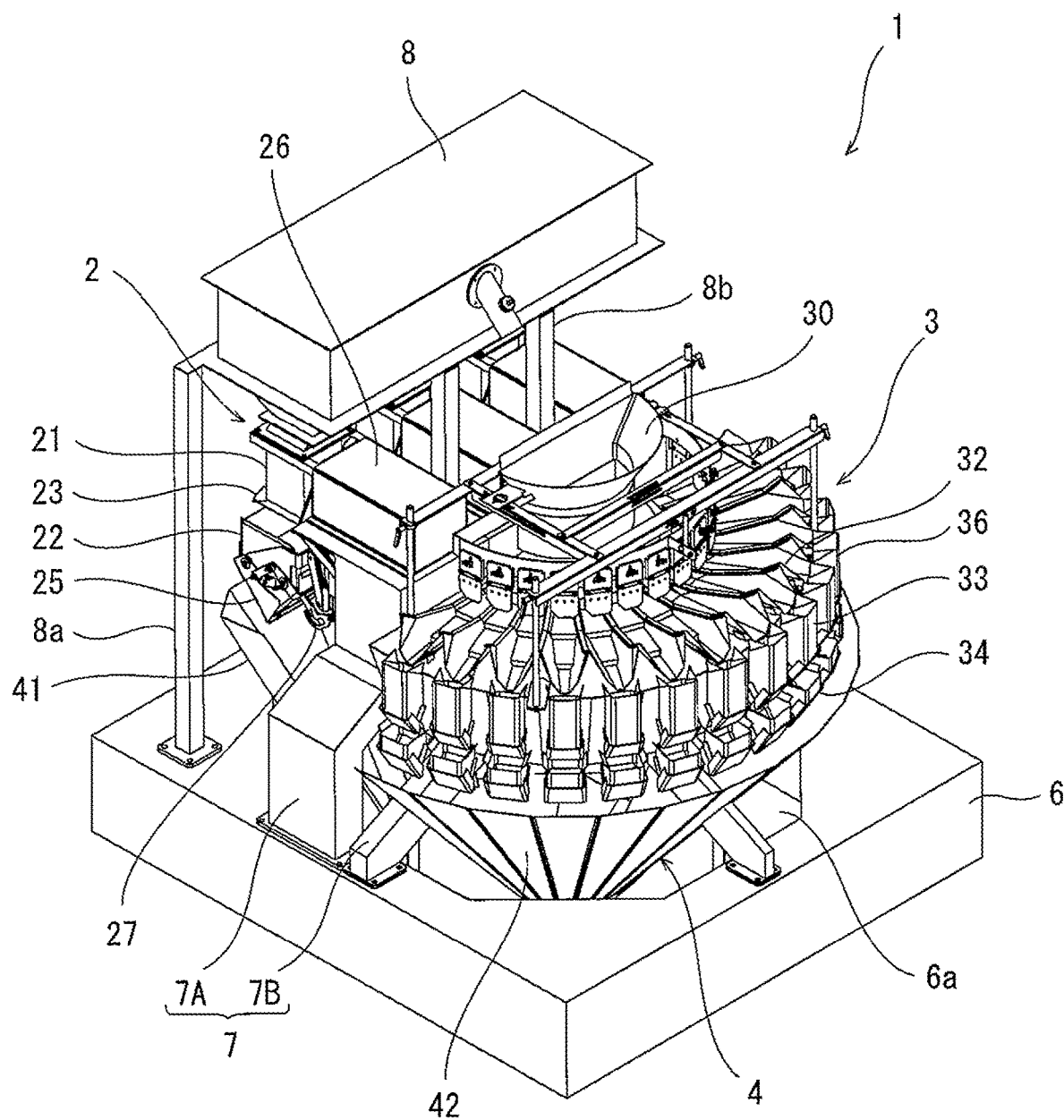
FIG. 2 is a top perspective view of the weighing apparatus 1 of FIG. 1 as seen from a different angle.
Figure 3:
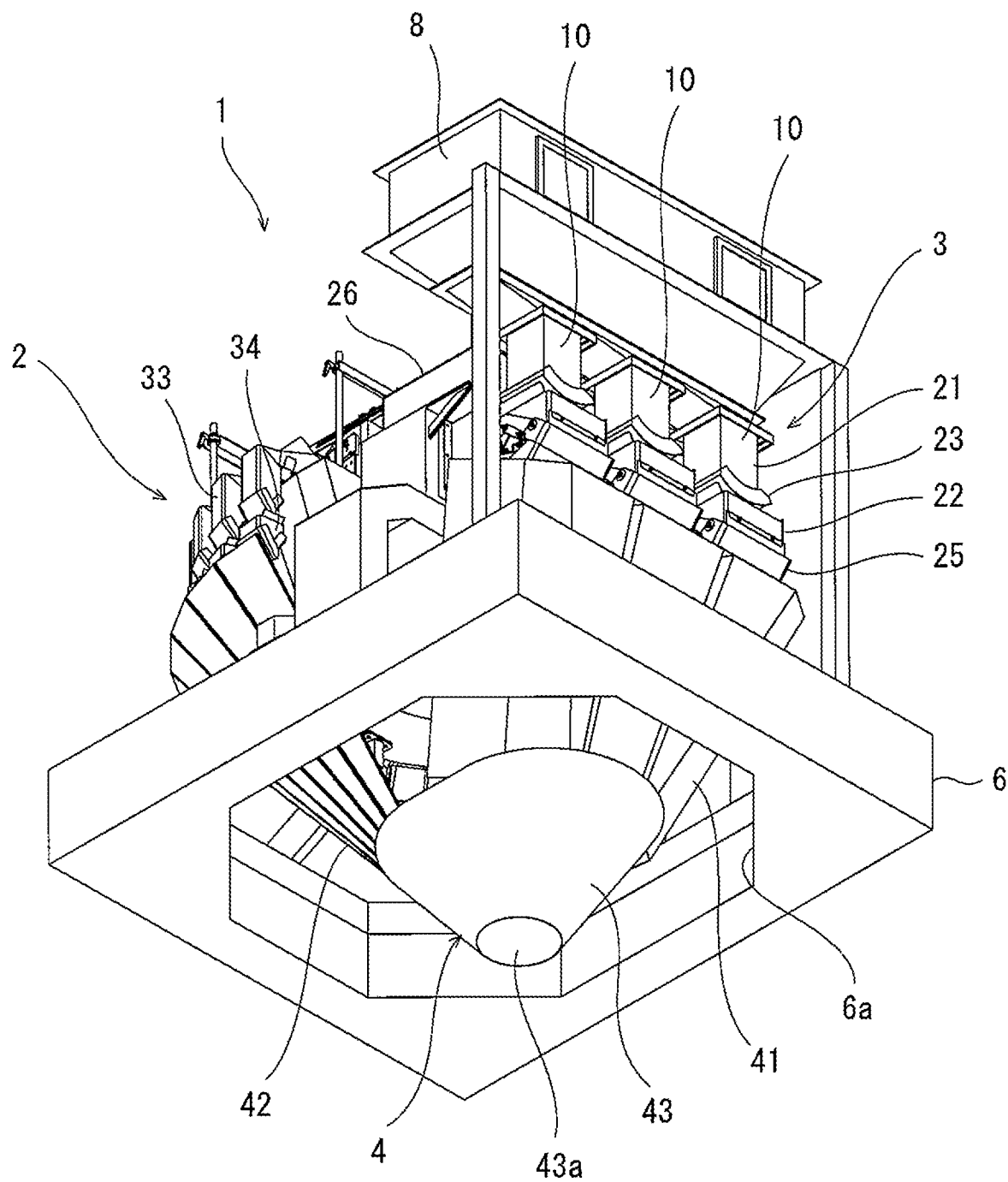
FIG. 3 is a bottom perspective view of the weighing apparatus 1 of FIG. 1.
Figure 4:
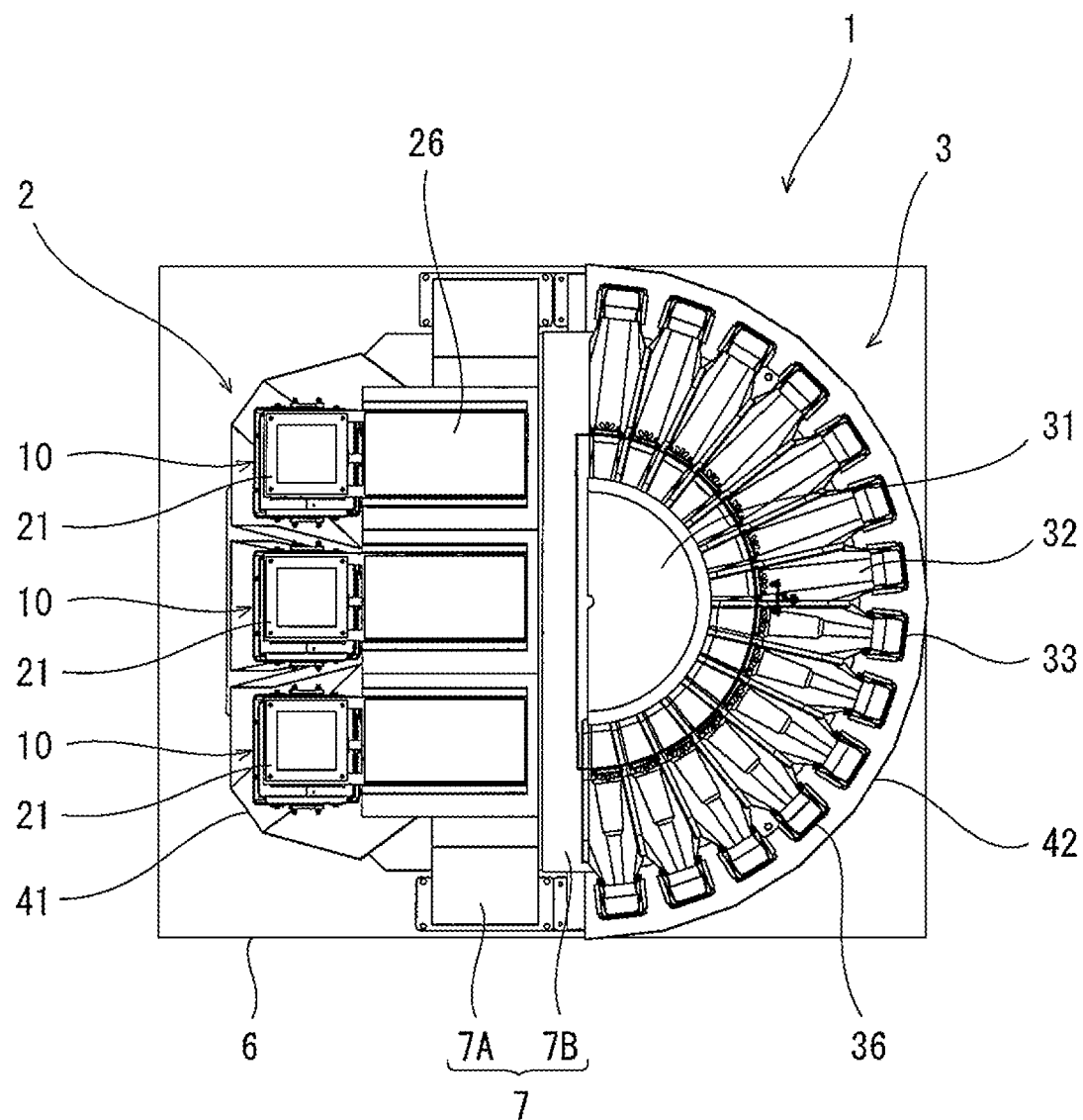
FIG. 4 is a top plan view of the weighing apparatus of FIG. 1.
Figure 5:
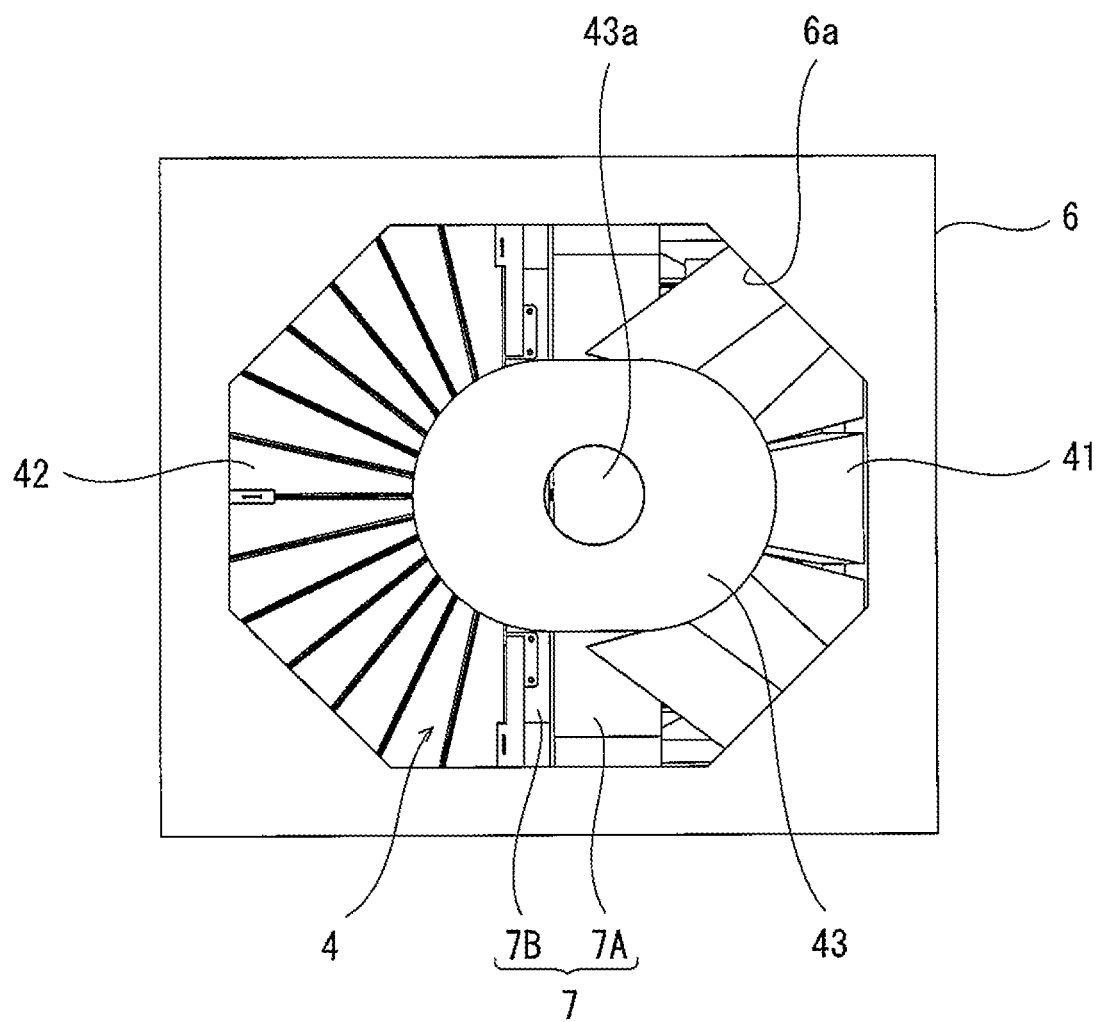
FIG. 5 is a bottom view of the weighing apparatus of FIG. 1.

FIG. 1 is a top perspective view of a weighing apparatus 1 according to Embodiment 1. FIG. 2 is a top perspective view of the weighing apparatus 1 of FIG. 1 as seen from a different angle. FIG. 3 is a bottom perspective view of the weighing apparatus 1 of FIG. 1. FIG. 4 is a top plan view of the weighing apparatus 1 of FIG. 1. FIG. 5 is a bottom view of the weighing apparatus 1 of FIG. 1. It should be noted that, in FIG. 4, the illustration of components, such as a common storage box 28 and a guide member 30, which will be described below, is omitted.

As shown in FIGS. 1 to 5, the weighing apparatus 1 is a heavy-weight weighing apparatus including: a rough-charge weigher 2; a combination weigher 3; a collecting chute 4 configured to collect weighed objects discharged from the rough-charge weigher 2 and weighed objects discharged from the combination weigher 3, and discharge the collected weighed objects; a control device 5 configured to control the rough-charge weigher 2 and the combination weigher 3; and a common bed 6. The common bed 6 is disposed below the rough-charge weigher 2 and the combination weigher 3, and supports the rough-charge weigher 2, the combination weigher 3, and the collecting chute 4 via a support frame 7. The support frame 7 includes a rough-charge weigher frame 7A and a combination weigher frame 7B. The rough-charge weigher frame 7A and the combination weigher frame 7B are disposed on the upper side of the common bed 6. The rough-charge weigher frame 7A and the combination weigher frame 7B are passed between the rough-charge weigher 2 and the combination weigher 3, and are coupled to the common bed 6. The control device 5 is disposed in an interior space S1 of the common bed 6.

[Rough-Charge Weigher]

The rough-charge weigher 2 weighs out objects to be weighed, such that the weighed objects have a predetermined rough-charge weight less than a target weight of the weighing apparatus 1, and discharges the weighed objects. The rough-charge weigher 2 includes a plurality of (e.g., three) rough-charge weighing units 10. The aforementioned common storage box 8, in which the objects to be weighed are stored temporarily, is provided above the rough-charge weighing units 10. The common storage box 8 is supported by the common bed 6 and the rough-charge weigher frame 7A via legs 8a and 8b. The common storage box 8 is connected to a plurality of upper hoppers 21, which will be described below. The objects to be weighed that are stored in the common storage box 8 are fed to each of the upper hoppers 21 by utilizing gravitational force.

The amount of weighed objects discharged from each of the rough-charge weighing units 10 is greater than the amount of weighed objects discharged from the combination weigher 3. Each of the rough-charge weighing units 10 weighs out the objects to be weighed, such that the weighed objects have a weight in a predetermined proportion to the target weight to be discharged from the collecting chute 4 (for example, the predetermined proportion is set within the range of 85 to 95% (e.g., 90%)) (hereinafter, the weight in the predetermined proportion to the target weight is referred to as "the rough-charge weight"), and discharges the weighed objects having the rough-charge weight to the collecting chute 4.

Each of the rough-charge weighing units 10 includes the upper hopper 21 (rough-charge hopper), a lower hopper 22 (rough-charge hopper), a cut gate 23, a weight sensor 24, a discharge gate 25, an upper hopper gate open/close device 26 (rough-charge actuator), and a lower hopper gate open/close device 27 (rough-charge actuator). The upper hopper 21 holds the objects to be weighed that are fed from the common storage box 8, and then discharges them downward. The lower hopper 22 is disposed below the upper hopper 21. The lower hopper 22 holds the objects to be weighed that are fed from the upper hopper 21, and then discharges them to the collecting chute 4. The cut gate 23 is provided on the upper hopper 21, and opens/closes a feed passage from the upper hopper 21 to the lower hopper 22.

The weight sensor 24 is a load cell. The weight sensor 24 weighs the objects to be weighed that are held in the lower hopper 22. The discharge gate 25 is provided on the lower hopper 22, and opens/closes a discharge passage from the lower hopper 22 to the collecting chute 4. The upper hopper gate open/close device 26 is an actuator configured to drive the cut gate 23 to open and close, and includes an electric motor (e.g., a servomotor or pulse motor). The lower hopper gate open/close device 27 is disposed below the upper hopper gate open/close device 26. The lower hopper gate open/close device 27 is an actuator configured to drive the discharge gate 25 to open and close, and includes an electric motor (e.g., a pulse motor).

The upper hopper gate open/close devices 26 are, when seen in a top plan view, disposed between the combination weigher 3 and the upper hoppers 21. The lower hopper gate open/close devices 27 are, when seen in a top plan view, disposed between the combination weigher 3 and the lower hoppers 22. The upper hopper gate open/close devices 26 and the lower hopper gate open/close devices 27 are mounted to the rough-charge weigher frame 7A. The rough-charge weigher frame 7A includes an interior space S2, which communicates with the interior space S1 of the common bed 6. The upper hoppers 21 and the lower hoppers 22 are supported by the rough-charge weigher frame 7A, which is a cantilever frame. Wires connecting the control device 5 to the weight sensors 24, the upper hopper gate open/close devices 26, and the lower hopper gate open/close devices 27 are accommodated in the interior spaces S1 and S2 of the common bed 6 and the rough-charge weigher frame 7A.

[Combination Weigher]

A dispersion feeder 31 including a vibrator is provided on the top part of the combination weigher 3. The aforementioned guide member 30 is provided above the dispersion feeder 31. The guide member 30 guides objects to be weighed that are fed from the outside toward the dispersion feeder 31. By utilizing vibration generated by the vibrator, the dispersion feeder 31 multi-directionally disperses the objects to be weighed that are fed from the outside. A plurality of linear feeders 32, each of which includes a vibrator, are provided outside the dispersion feeder 31. The linear feeders 32, by utilizing vibration, convey the objects to be weighed that are fed from the dispersion feeder 31, and feed out the objects to be weighed to feeding hoppers 33, which are provided at the object feed-out side of the linear feeders 32, respectively.

Each of the feeding hoppers 33 holds the objects to be weighed that are fed from a corresponding one of the linear feeders 32, and discharges them downward. Weighing hoppers 34 are provided below the feeding hoppers 33, respectively. Each weighing hopper 34 is provided with a weight sensor 35 (see FIG. 6), which is a load cell. Each weighing hopper 34 weighs the objects to be weighed that are held therein by means of the weight sensor 35. The combination weigher 3 includes a plurality of (e.g., 4 to 20) weighing units 36, each of which is constituted by the linear feeder 32, the feeding hopper 33, the weighing hopper 34, and the weight sensor 35. The plurality of weighing units 36 are, when seen in a top plan view, arranged in a manner to form a semicircular line.

[Collecting Chute, etc.]

The weighed objects discharged from the rough-charge weigher 2 and the weighed objects discharged from the combination weigher 3 are gathered together in the collecting chute 4, and then discharged from a discharge port of the collecting chute 4 to a packaging machine (not shown). The common bed 6 includes a center opening 6a, which is open in the vertical direction. That is, when seen in a plan view, the common bed 6 forms a closed loop. The collecting chute 4 is inserted in the center opening 6a of the common bed 6 from above. The collecting chute 4 includes a first upper chute part 41, a second upper chute part 42, and a lower chute part 43.

The first upper chute part 41 guides the weighed objects discharged from each of the lower hoppers 22 of the rough-charge weigher 2 diagonally downward toward the lower chute part 43. The second upper chute part 42 guides the weighed objects discharged from each of the weighing hoppers 34 of the combination weigher 3 diagonally downward toward the lower chute part 43. The second upper chute part 42 is spaced apart from the first upper chute part 41. The lower chute part 43 collects the weighed objects discharged from the first upper chute part 41 and the weighed objects discharged from the second upper chute part 42, and discharges the collected weighed objects downward.

The first upper chute part 41 is disposed such that it is closer to the rough-charge weighing units 10 than the rough-charge weigher frame 7A and the combination weigher frame 7B are. The second upper chute part 42 is disposed such that it is closer to the weighing units 36 than the rough-charge weigher frame 7A and the combination weigher frame 7B are. That is, when seen in a top plan view, the rough-charge weigher frame 7A and the combination weigher frame 7B are disposed between the first upper chute part 41 and the second upper chute part 42. The rough-charge weigher frame 7A and the combination weigher frame 7B are longer in dimension than the first upper chute part 41 in the direction in which the rough-charge weighing units 10 are arranged side by side. The discharge port of the collecting chute 4, i.e., a discharge port 43a of the lower chute part 43, is provided at a position that is closer to the rough-charge weigher 2 than to the combination weigher 3. The discharge port 43a of the lower chute part 43 is disposed such that the position of the discharge port 43a is shifted from the center of the center opening 6a of the common bed 6 toward the rough-charge weigher 2.

[Control System]

Figure 6:
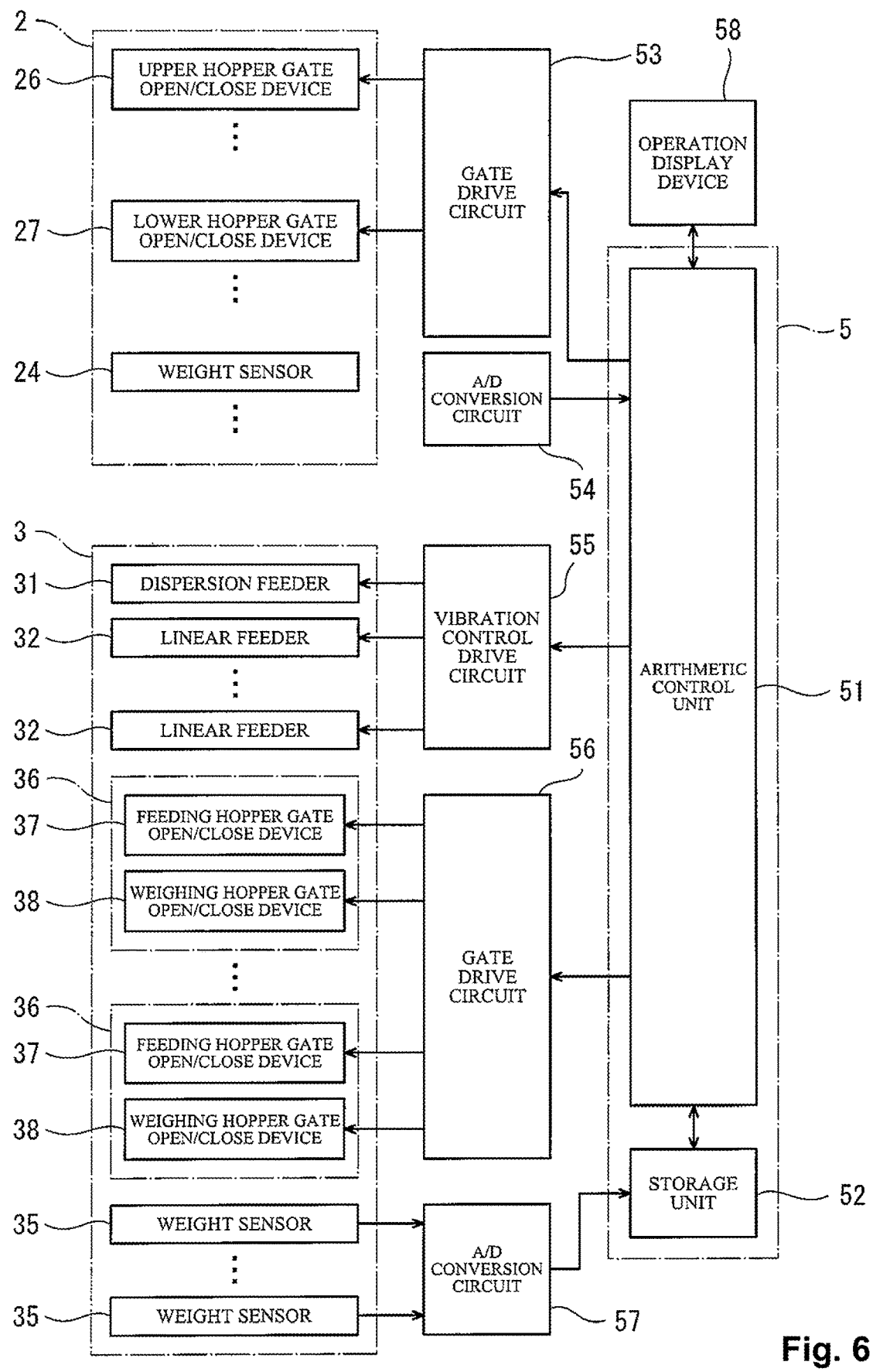
FIG. 6 is a block diagram of a control system of the weighing apparatus shown in FIG. 1.

FIG. 6 is a block diagram of a control system of the weighing apparatus 1 shown in FIG. 1. As shown in FIG. 6, the control device 5 includes: an arithmetic control unit 51 including, for example, a CPU; and a storage unit 52 including memories such as a RAM and a ROM. The storage unit 52 stores therein, for example, a running program, running setting data containing a large number of running parameters, and weighing value data. The arithmetic control unit 51 executes the running program stored in the storage unit 52 to, for example, control the rough-charge weigher 2 and the combination weigher 3.

In relation to the control of the rough-charge weigher 2, the arithmetic control unit 51 controls, via a gate drive circuit 53, operations of the upper hopper gate open/close devices 26 and operations of the lower hopper gate open/close devices 27. The arithmetic control unit 51 receives weighing values from the weight sensors 24 of the rough-charge weigher 2 via an A/D conversion circuit 54.

In relation to the control of the combination weigher 3, the arithmetic control unit 51 controls the operation of the vibrator of the dispersion feeder 31 and the operation of each of the vibrators of the linear feeders 32 via a vibration control drive circuit 55. The arithmetic control unit 51 controls, via a gate drive circuit 56, operations of feeding hopper gate open/close devices 37 configured to open/close the gates of the feeding hoppers 33 and operations of weighing hopper gate open/close devices 38 configured to open/close the gates of the weighing hoppers 34. Each of the feeding hopper gate open/close devices 37 and the weighing hopper gate open/close devices 38 includes, for example, a pulse motor as an actuator. The arithmetic control unit 51 receives weighing values from the weight sensors 35 of the combination weigher 3 via an A/D conversion circuit 57. The arithmetic control unit 51 receives input signals from an operation display device 58, and outputs signals to the operation display device 58, such as data to be displayed thereon.

The arithmetic control unit 51 performs combination calculation, in which: the difference between the target weight and the weight of the weighed objects that have been weighed out by one of the plurality of rough-charge weighing units 10 is used as a target combination weight; and based on weights of the weighed objects that have been weighed by the plurality of weighing hoppers 34 and the target combination weight, a combination of weighing hoppers 34, from which to discharge the weighed objects, is selected from among the plurality of weighing hoppers 34. Then, the weighing hopper gate open/close devices 38 corresponding to the selected weighing hoppers 34 are driven so as to discharge the weighed objects therefrom.

[Details of Arrangement]

Figure 7:
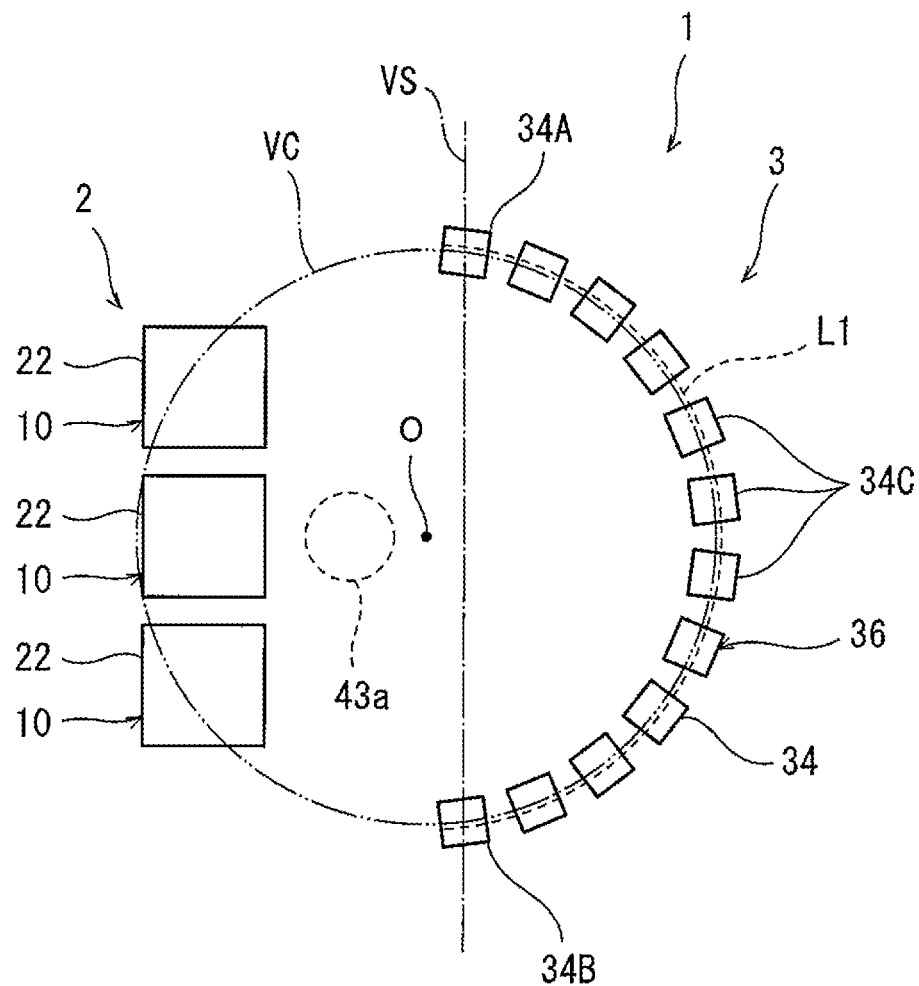
FIG. 7 is a schematic diagram showing a top view of essential parts of the weighing apparatus of FIG. 4.

FIG. 7 is a schematic diagram showing a top view of essential parts of the weighing apparatus 1 of FIG. 4. As shown in FIG. 7, the weighing units 36 of the combination weigher 3 are, when seen in a plan view, arranged in a manner to form a semicircular line L1, which constitutes a part of a virtual circle VC, which is similar to a perfect circle. That is, the weighing hoppers 34 are positioned such that the centers thereof are arranged side by side on the virtual circle VC. The plurality of weighing hoppers 34 include: a one-end weighing hopper 34A disposed at one end of the line L1; an other-end weighing hopper 34B disposed at the other end of the line L1; and a plurality of middle weighing hoppers 34C arranged on the line L1 between the one-end weighing hopper 34A and the other-end weighing hopper 34B.

The rough-charge weigher 2 is, when seen from the one-end weighing hopper 34A and the other-end weighing hopper 34B, disposed at the opposite side to the middle weighing hoppers 34C. When seen in a plan view, a part of the rough-charge weigher 2 is disposed inside the virtual circle VC, and another part of the rough-charge weigher 2 is disposed on the virtual circle VC. Specifically, the upper hoppers 21 and the lower hoppers 22 are partly disposed inside the virtual circle VC or on the virtual circle VC. When seen in a plan view, the distance between the center point O of the virtual circle VC and each of the lower hoppers 22 of the rough-charge weigher 2 is shorter than the distance between the center point O of the virtual circle VC and each of the weighing hoppers 34 of the combination weigher 3. In the present embodiment, among the three rough-charge weighing units, the lower hopper 22 of the center rough-charge weighing unit 10 is disposed inside the virtual circle VC, and the lower hoppers 22 of the rough-charge weighing units 10 on both sides are disposed on the virtual circle VC.

The plurality of rough-charge weighing units 10 are, when seen in a top plan view, arranged side by side along a virtual straight line VS, which passes through the one-end weighing hopper 34A and the other-end weighing hopper 34B. Specifically, the rough-charge weighing units 10 are arranged side by side in a straight line parallel to the virtual straight line VS. The discharge port 43a of the collecting chute 4 is disposed at a position that is closer to the lower hoppers 22 of the rough-charge weigher 2 than to the weighing hoppers 34 of the combination weigher 3. The center of the discharge port 43a of the collecting chute 4 is, when seen in a plan view, positioned inside the virtual circle VC and shifted from the center point O of the virtual circle VC toward the rough-charge weigher 2.

[Functional Advantages]

According to the above-described configuration, the weighing hoppers 34 of the combination weigher 3 are arranged in a manner to form the line L1, which constitutes a part of the virtual circle VC. Accordingly, when seen from the one-end weighing hopper 34A and the other-end weighing hopper 34B, an empty space can be formed inside the virtual circle VC or on the virtual circle VC at the opposite side to the middle weighing hoppers 34C, and the rough-charge weigher 2 can be disposed in the empty space. As a result, the distance between the rough-charge weigher 2 and the weighing hoppers 34 positioned at the farther side as seen from the rough-charge weigher 2 can be shortened, which makes it possible to reduce the size of the overall weighing apparatus 1.

In addition, since the line L1 formed by the weighing hoppers 34 of the combination weigher 3 is a semicircular line, protrusion of the rough-charge weigher 2 from the virtual circle VC can be reduced sufficiently, and thereby the weighing apparatus 1 can be reduced in size effectively. Moreover, the upper hoppers 21 and the lower hoppers 22 are, when seen in a plan view, arranged side by side along the virtual straight line VS, which passes through the one-end weighing hopper 34A and the other-end weighing hopper 34B. This also makes it possible to effectively reduce the size of the weighing apparatus 1.

Furthermore, the upper hopper gate open/close devices 26 are disposed between the combination weigher 3 and the upper hoppers 21, and the lower hopper gate open/close devices 27 are disposed between the combination weigher 3 and the lower hoppers 22. This makes it possible to keep the weighing apparatus 1 compact while allowing the upper hoppers 21 and the lower hoppers 22 to be readily visually recognized from the outside.

The collecting chute 4 is inserted in the center opening of the common bed 6, which supports the rough-charge weigher 2 and the combination weigher 3 from below. This makes it possible to suppress increase in the height of the weighing apparatus 1 while forming the weighing apparatus 1 as a unit.

Since the discharge port 43a of the collecting chute 4 is closer to the rough-charge weigher 2 than to the combination weigher 3, even if a time required for discharging the weighed objects from the rough-charge weigher 2 to the collecting chute 4 is longer than a time required for discharging the weighed objects from the combination weigher 3 to the collecting chute 4, a time from when the discharging from the rough-charge weigher 2 starts until when the discharging from the collecting chute 4 ends can be shortened. This makes it possible to increase the weighing speed of the overall weighing apparatus 1.

Embodiment 2

Figure 8:
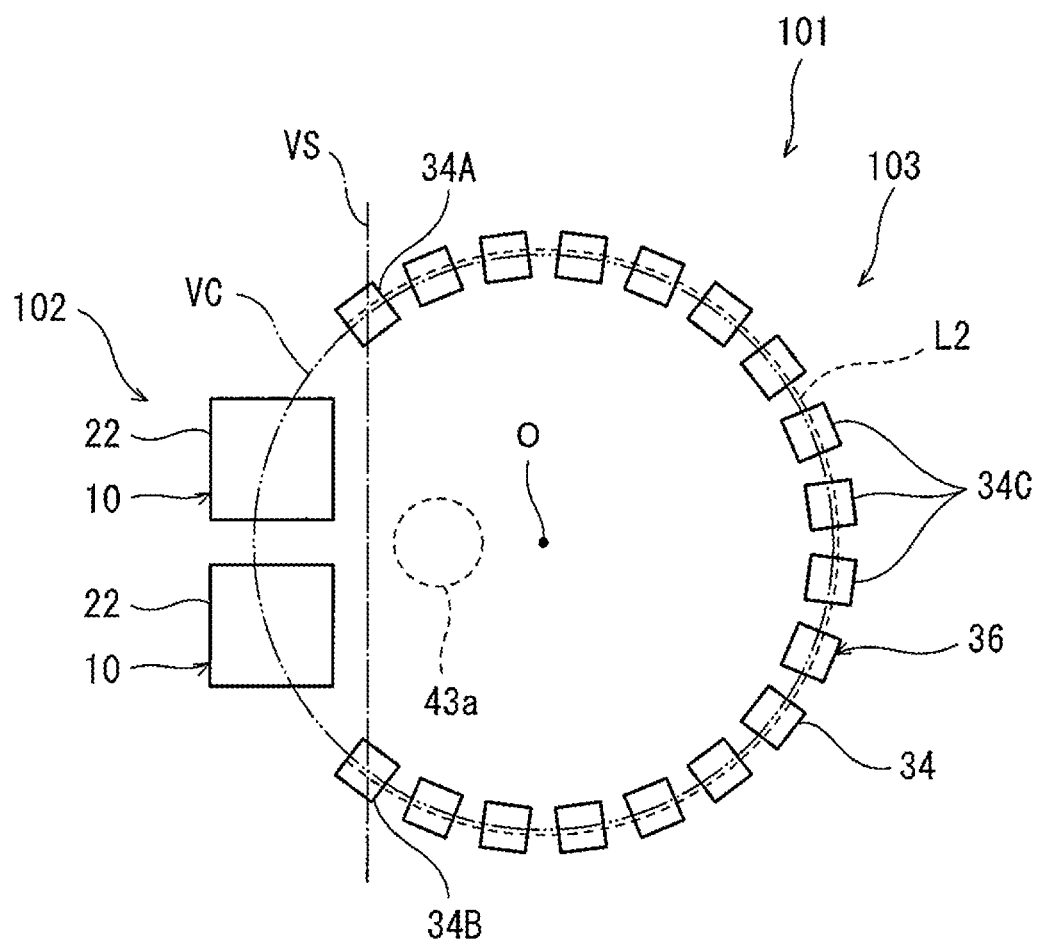
FIG. 8 is a schematic diagram of a weighing apparatus according to Embodiment 2, corresponding to FIG. 7.

FIG. 8 is a schematic diagram of a weighing apparatus 101 according to Embodiment 2, corresponding to FIG. 7. As shown in FIG. 8, in the weighing apparatus 101, the weighing units 36 of a combination weigher 103 are, when seen in a plan view, arranged in a manner to form a C-shaped line L2, which constitutes a part of the virtual circle VC. That is, the weighing hoppers 34 are positioned such that the centers thereof are arranged side by side on the virtual circle VC. A rough-charge weigher 102 includes a plurality of (e.g., two) rough-charge weighing units 10. The rough-charge weigher 102 is, when seen from the one-end weighing hopper 34A and the other-end weighing hopper 34B, disposed at the opposite side to the middle weighing hoppers 34C. Each of the rough-charge weighing units 10 of the rough-charge weigher 102 is disposed on the virtual circle VC. When seen in a plan view, the distance between the center point O of the virtual circle VC and each of the lower hoppers 22 of the rough-charge weigher 102 is shorter than the distance between the center point O of the virtual circle VC and each of the weighing hoppers 34 of the combination weigher 103. The plurality of rough-charge weighing units 10 are, when seen in a top plan view, arranged side by side along the virtual straight line VS, which passes through the one-end weighing hopper 34A and the other-end weighing hopper 34B.

According to the above-described configuration, the line L2 formed by the plurality of weighing hoppers 34 of the combination weigher 103 is C-shaped. This makes it possible to reduce the size of the weighing apparatus 101 while sufficiently obtaining the number and/or capacity of weighing hoppers 34 of the combination weigher 103 so as to achieve high precision in combination weighing. Since the other configurational features are the same as those described above in Embodiment 1, the description thereof is omitted.

The present invention is not limited to the above-described embodiments, and modifications, additions, or deletions can be made to the configurations thereof. For example, all of the plurality of rough-charge weighing units 10 may be disposed inside the virtual circle VC. Alternatively, some of the plurality of rough-charge weighing units 10 may be disposed inside the virtual circle VC or on the virtual circle VC, and the remaining rough-charge weighing units 10 may be disposed outside the virtual circle VC. The plurality of rough-charge weighing units 10 may be arranged side by side not in a straight line, but in an arc shape. That is, the plurality of rough-charge weighing units 10 may be arranged on the virtual circle VC side by side along the virtual straight line VS. The virtual circle VC may be an ellipse.

In the combination weigher 3, charging of the objects to be weighed from each feeding hopper 33 into the corresponding weighing hopper 34 may be performed not by volume charging, but by charge weighing. Specifically, the combination weigher 3 may be configured such that: when the objects to be weighed are fed from the feeding hopper 33 to the weighing hopper 34, the weight of the objects fed from the feeding hopper 33 to the weighing hopper 34 is continuously measured by the weight sensor 35; and at a point when the measured weight of the objects fed to the weighing hopper 34 has reached an intended weight, the gate of the feeding hopper 33 is closed. By adopting such a configuration, the number of weighing hoppers 34 can be favorably reduced while keeping high weighing precision of the combination weigher 3. The weight sensors 24 of the rough-charge weigher 2 may be provided not on the respective lower hoppers 22, but on the respective upper hoppers 21, and in this case, a reduction in the weight of the objects to be weighed that are held in each upper hopper 21 may be detected as the weight of the objects to be weighed that have been fed to the corresponding lower hopper 22. Instead of the upper hoppers 21, feeders may be used as devices for feeding the objects to be weighed to the respective lower hoppers 22.

REFERENCE CHARACTERS LIST 1, 101 weighing apparatus
2, 102 rough-charge weigher
3, 103 combination weigher
4 collecting chute
6 common bed
6a center opening
7 support frame
21 upper hopper (rough-charge hopper)
22 lower hopper (rough-charge hopper)
26 upper hopper gate open/close device (rough-charge actuator)
27 lower hopper gate open/close device (rough-charge actuator)
34 weighing hopper
34A one-end weighing hopper
34B other-end weighing hopper
34C middle weighing hopper
41 first upper chute part
42 second upper chute part
43 lower chute part
43a discharge port
L1, L2 line
VC virtual circle
VS virtual straight line

The invention claimed is:

1. A weighing apparatus comprising:
a rough-charge weigher including at least one rough-charge hopper configured to be fed with objects to be weighed, the rough-charge weigher being configured to weigh out the fed objects to be weighed, such that the weighed objects have a predetermined rough-charge weight less than a target weight, and discharge the weighed objects;
a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers;
a common storage box in which the objects to be weighed are stored temporarily, the common storage box being provided directly above the rough-charge weigher; and
a collecting chute configured to collect the weighed objects discharged from the rough-charge weigher and the weighed objects discharged from the combination weigher, and discharge the collected weighed objects, wherein
the plurality of weighing hoppers are, when seen in a plan view, arranged in a manner to form a line that constitutes a part of a virtual circle,
the plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper, and
the rough-charge weigher is, when seen from the one-end weighing hopper and the other-end weighing hopper, disposed at an opposite side to the middle weighing hoppers, and at least a part of the rough-charge weigher is disposed inside the virtual circle or on the virtual circle.

2. The weighing apparatus according to claim 1, wherein
the at least one rough-charge hopper includes a plurality of rough-charge hoppers, and
the plurality of rough-charge hoppers are, when seen in a plan view, arranged side by side along a virtual straight line that passes through the one-end weighing hopper and the other-end weighing hopper.

3. The weighing apparatus according to claim 1, wherein
the rough-charge weigher includes a rough-charge actuator configured to perform a discharge operation of the rough-charge hopper, and
the rough-charge actuator is, when seen in a plan view, disposed between the rough-charge hopper and the combination weigher.

4. The weighing apparatus according to claim 1, further comprising a common bed configured to support the rough-charge weigher and the combination weigher, wherein
the common bed includes a center opening that is open in a vertical direction, and
the collecting chute is inserted in the center opening.

5. The weighing apparatus according to claim 1, wherein
an amount of the weighed objects discharged from the rough-charge weigher is greater than an amount of the weighed objects discharged from the combination weigher, and
the collecting chute includes a discharge port that is closer to the rough-charge weigher than to the combination weigher.

6. The weighing apparatus according to claim 1, wherein
the line is a semicircular line, and
the rough-charge weigher is disposed inside the virtual circle, or is disposed on the virtual circle such that a position of the rough-charge weigher is shifted relative to the virtual circle toward the inside of the virtual circle.

7. The weighing apparatus according to claim 1, wherein
the line is a C-shaped line, and
the rough-charge weigher is disposed on the virtual circle.

8. A weighing apparatus comprising:
a rough-charge weigher including at least one rough-charge hopper configured to be fed with objects to be weighed, the rough-charge weigher being configured to weigh out the fed objects to be weighed, such that the weighed objects have a predetermined rough-charge weight less than a target weight, and discharge the weighed objects;
a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers; and
a collecting chute configured to collect the weighed objects discharged from the rough-charge weigher and the weighed objects discharged from the combination weigher, and discharge the collected weighed objects, wherein
the plurality of weighing hoppers are, when seen in a plan view, arranged in a manner to form a line that constitutes a part of a virtual circle,
the plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper,
the rough-charge weigher is, when seen from the one-end weighing hopper and the other-end weighing hopper, disposed at an opposite side to the middle weighing hoppers,
the at least one rough-charge hopper includes a plurality of rough-charge hoppers, and,
all of the plurality of rough-charge hoppers are disposed inside the virtual circle or on the virtual circle.

9. The weighing apparatus according to claim 8, wherein
the plurality of rough-charge hoppers are, when seen in a plan view, arranged side by side along a virtual straight line that passes through the one-end weighing hopper and the other-end weighing hopper.

10. The weighing apparatus according to claim 8, wherein
the rough-charge weigher includes a rough-charge actuator configured to perform a discharge operation of the rough-charge hopper, and
the rough-charge actuator is, when seen in a plan view, disposed between the rough-charge hopper and the combination weigher.

11. The weighing apparatus according to claim 8, further comprising a common bed configured to support the rough-charge weigher and the combination weigher, wherein
the common bed includes a center opening that is open in a vertical direction, and
the collecting chute is inserted in the center opening.

12. The weighing apparatus according to claim 8, wherein
an amount of the weighed objects discharged from the rough-charge weigher is greater than an amount of the weighed objects discharged from the combination weigher, and
the collecting chute includes a discharge port that is closer to the rough-charge weigher than to the combination weigher.

13. The weighing apparatus according to claim 8, wherein the line is a semicircular line, and
the rough-charge weigher is disposed inside the virtual circle, or is disposed on the virtual circle such that a position of the rough-charge weigher is shifted relative to the virtual circle toward the inside of the virtual circle.

14. The weighing apparatus according to claim 8, wherein the line is a C-shaped line, and
the rough-charge weigher is disposed on the virtual circle.

15. A weighing apparatus comprising:
a rough-charge weigher including at least one rough-charge hopper configured to be fed with objects to be weighed, the rough-charge weigher being configured to weigh out the fed objects to be weighed, such that the weighed objects have a predetermined rough-charge weight less than a target weight, and discharge the weighed objects;
a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers; and
a collecting chute configured to collect the weighed objects discharged from the rough-charge weigher and the weighed objects discharged from the combination weigher, and discharge the collected weighed objects, wherein
the plurality of weighing hoppers are, when seen in a plan view, arranged in a manner to form a line that constitutes a part of a virtual circle,
the plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper,
the rough-charge weigher is, when seen from the one-end weighing hopper and the other-end weighing hopper, disposed at an opposite side to the middle weighing hoppers, and at least a part of the rough-charge weigher is disposed inside the virtual circle or on the virtual circle,
the at least one rough-charge hopper includes a plurality of rough-charge hoppers, and
the plurality of rough-charge hoppers are, when seen in a plan view, arranged side by side along a virtual straight line that passes through the one-end weighing hopper and the other-end weighing hopper.

16. The weighing apparatus according to claim 15, wherein
the rough-charge weigher includes a rough-charge actuator configured to perform a discharge operation of the rough-charge hopper, and
the rough-charge actuator is, when seen in a plan view, disposed between the rough-charge hopper and the combination weigher.

17. The weighing apparatus according to claim 15, wherein
the line is a semicircular line, and
the rough-charge weigher is disposed inside the virtual circle, or is disposed on the virtual circle such that a position of the rough-charge weigher is shifted relative to the virtual circle toward the inside of the virtual circle.

18. The weighing apparatus according to claim 15, wherein
the line is a C-shaped line, and
the rough-charge weigher is disposed on the virtual circle.

19. A weighing apparatus comprising:
a rough-charge weigher including at least one rough-charge hopper configured to be fed with objects to be weighed, the rough-charge weigher being configured to weigh out the fed objects to be weighed, such that the weighed objects have a predetermined rough-charge weight less than a target weight, and discharge the weighed objects;
a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers;
a collecting chute configured to collect the weighed objects discharged from the rough-charge weigher and the weighed objects discharged from the combination weigher, and discharge the collected weighed objects;
a common bed configured to support the rough-charge weigher and the combination weigher, wherein
the plurality of weighing hoppers are, when seen in a plan view, arranged in a manner to form a line that constitutes a part of a virtual circle,
the plurality of weighing hoppers include a one-end weighing hopper disposed at one end of the line, an other-end weighing hopper disposed at the other end of the line, and a plurality of middle weighing hoppers arranged on the line between the one-end weighing hopper and the other-end weighing hopper,
the rough-charge weigher is, when seen from the one-end weighing hopper and the other-end weighing hopper, disposed at an opposite side to the middle weighing hoppers, and at least a part of the rough-charge weigher is disposed inside the virtual circle or on the virtual circle,
the common bed includes a center opening that is open in a vertical direction, and
the collecting chute is inserted in the center opening,
an amount of the weighed objects discharged from the rough-charge weigher is greater than an amount of the weighed objects discharged from the combination weigher, and
the collecting chute includes a discharge port that is disposed such that a position of the discharge port is shifted from a center of the center opening of the common bed toward the rough-charge weigher.

\* \* \* \* \*